United States Patent
Roche et al.

(10) Patent No.: US 12,143,387 B2
(45) Date of Patent: Nov. 12, 2024

(54) DYNAMIC AUTHORIZATION IN A MULTI-TENANCY ENVIRONMENT VIA TENANT POLICY PROFILES

(71) Applicant: EMC IP Holding Company LLC, Hopkinton, MA (US)

(72) Inventors: Michael G. Roche, Hamilton (CA); Michal J. Drozd, Cracow (PL)

(73) Assignee: EMC IP Holding Company LLC, Hopkinton, MA (US)

( * ) Notice: Subject to any disclaimer, the term of this patent is extended or adjusted under 35 U.S.C. 154(b) by 256 days.

(21) Appl. No.: 16/743,567

(22) Filed: Jan. 15, 2020

(65) Prior Publication Data
US 2020/0153870 A1 May 14, 2020

Related U.S. Application Data

(63) Continuation of application No. 15/216,193, filed on Jul. 21, 2016, now Pat. No. 10,659,495, which is a continuation of application No. 14/510,737, filed on Oct. 9, 2014, now Pat. No. 9,432,379.

(51) Int. Cl.
*H04L 9/40* (2022.01)

(52) U.S. Cl.
CPC ............ *H04L 63/102* (2013.01); *H04L 63/08* (2013.01); *H04L 63/10* (2013.01); *H04L 63/20* (2013.01)

(58) Field of Classification Search
CPC ....... H04L 63/102; H04L 63/08; H04L 63/10; H04L 63/20
See application file for complete search history.

(56) References Cited

U.S. PATENT DOCUMENTS

| | | | |
|---|---|---|---|
| 7,836,163 B2 | 11/2010 | Salesky | |
| 7,984,298 B2* | 7/2011 | Wei | H04L 63/205 |
| | | | 713/171 |
| 8,930,462 B1 | 1/2015 | Banerjee | |
| 8,949,597 B1* | 2/2015 | Reeves | H04L 9/3268 |
| | | | 726/4 |

(Continued)

OTHER PUBLICATIONS

U.S. Appl. No. 14/510,737, Jun. 7, 2016, Notice of Allowance.

(Continued)

*Primary Examiner* — Trang T Doan
(74) *Attorney, Agent, or Firm* — Workman Nydegger

(57) ABSTRACT

In one example, a method for managing user access to data contained in a computing system, includes receiving a token from an authentication service, wherein the token includes an application role and associated privilege mask; receiving an authentication request from an entity seeking access to an application; comparing information in the authentication request with the token; approving the authentication request when the information in the authentication request matches the token, and granting access to the application when the authentication request has been approved, and denying access to the application when the information in the authentication request does not match the token. The receiving, comparing, approving, granting, and denying processes are performed by the application to which the entity is seeking access, and wherein when the entity, or a different entity, seeks access to another application, user access to the another application is controlled by the another application.

12 Claims, 9 Drawing Sheets

(56) References Cited

U.S. PATENT DOCUMENTS

| | | | |
|---|---|---|---|
| 9,038,148 B1 | 5/2015 | Roth et al. | |
| 9,203,818 B1 | 12/2015 | Roth et al. | |
| 2003/0018910 A1* | 1/2003 | Wert | H04L 63/083 726/27 |
| 2006/0236382 A1* | 10/2006 | Hinton | G06F 21/41 726/8 |
| 2007/0022190 A1* | 1/2007 | Brasegard | H04L 63/102 709/223 |
| 2007/0130463 A1* | 6/2007 | Law | G06F 21/34 713/168 |
| 2009/0006856 A1* | 1/2009 | Abraham | G06F 21/55 713/183 |
| 2010/0125612 A1* | 5/2010 | Amradkar | H04L 63/105 707/E17.014 |
| 2010/0162370 A1 | 6/2010 | Aitay et al. | |
| 2010/0198730 A1 | 8/2010 | Ahmed et al. | |
| 2011/0167256 A1* | 7/2011 | Lee | H04L 63/104 713/155 |
| 2011/0167483 A1* | 7/2011 | Lee | G06F 21/6218 726/6 |
| 2012/0144454 A1 | 6/2012 | Lee | |
| 2012/0331518 A1 | 12/2012 | Lee | |
| 2013/0046696 A1* | 2/2013 | Radhakrishnan | H04L 63/10 705/65 |
| 2013/0047251 A1 | 2/2013 | Radhakrishnan et al. | |
| 2013/0086629 A1* | 4/2013 | Kavantzas | G06F 21/33 726/1 |
| 2013/0086642 A1* | 4/2013 | Resch | H04L 9/321 726/4 |
| 2013/0086658 A1* | 4/2013 | Kottahachchi | H04L 63/10 726/6 |
| 2013/0125217 A1 | 5/2013 | Edwards et al. | |
| 2014/0047532 A1 | 2/2014 | Sowatskey | |
| 2014/0068700 A1 | 3/2014 | Reilly et al. | |
| 2014/0124570 A1 | 5/2014 | Franklin | |
| 2014/0196115 A1* | 7/2014 | Pelykh | H04L 63/08 726/4 |
| 2014/0215595 A1* | 7/2014 | Prasad | G06F 21/41 726/8 |
| 2015/0007263 A1 | 1/2015 | Stewart et al. | |
| 2015/0100788 A1 | 4/2015 | Chastain et al. | |
| 2015/0101020 A1* | 4/2015 | Kwok | H04L 63/20 726/4 |
| 2015/0135296 A1* | 5/2015 | Cason | H04L 63/0815 726/8 |
| 2015/0156193 A1* | 6/2015 | Chen | G06F 21/33 713/156 |
| 2015/0207830 A1 | 7/2015 | DeLuca et al. | |
| 2015/0215348 A1* | 7/2015 | Koeten | H04L 65/1073 709/225 |
| 2015/0254450 A1* | 9/2015 | Ravi | G06F 21/41 726/8 |
| 2015/0312242 A1 | 10/2015 | Ogawa | |
| 2015/0319177 A1 | 11/2015 | Lietz et al. | |
| 2015/0370824 A1 | 12/2015 | Chui et al. | |

OTHER PUBLICATIONS

U.S. Appl. No. 15/216,193, Dec. 2, 2016, Office Action.
U.S. Appl. No. 15/216,193, Jul. 31, 2017, Final Office Action.
U.S. Appl. No. 15/216,193, Mar. 29, 2018, Office Action.
U.S. Appl. No. 15/216,193, Nov. 21, 2018, Final Office Action.
U.S. Appl. No. 15/216,193, May 24, 2019, Office Action.
U.S. Appl. No. 15/216,193, Nov. 20, 2019, Final Office Action.

* cited by examiner

| Application Name | |
|---|---|
| Application Version | |
| Application Role1 | Role1 Opaque Object1 |
| Application Role2 | Role2 Opaque Object1 |
| Application Role3 | Role3 Opaque Object1 |
| Application Role4 | Role4 Opaque Object1 |

616 = {Application Role1 ... Application Role4}
618 = {Role1 Opaque Object1 ... Role4 Opaque Object1}

*FIG. 4A*

| Restricted Data Name | |
|---|---|
| Restricted Data Version | |
| Restricted Data Role1 | Role1 Opaque Object1 |
| Restricted Data Role2 | Role2 Opaque Object1 |
| Restricted Data Role3 | Role3 Opaque Object1 |
| Restricted Data Role4 | Role4 Opaque Object1 |

617 = {Restricted Data Role1 ... Restricted Data Role4}
619 = {Role1 Opaque Object1 ... Role4 Opaque Object1}

*FIG. 4B*

DYNAMIC AUTHORIZATION IN A MULTI-TENANCY ENVIRONMENT VIA TENANT POLICY PROFILES

RELATED APPLICATIONS

This application is a continuation, and hereby claims the benefit, of U.S. patent application Ser. No. 15/216,193, filed Jul. 21, 2016, which is a continuation, and claims the benefit, of U.S. patent application Ser. No. 14/510,737, filed Oct. 9, 2014 and granted on Aug. 30, 2016 as U.S. Pat. No. 9,432,379. The aforementioned applications are incorporated herein in their entirety by this reference.

FIELD OF THE INVENTION

Embodiments of the present invention generally concern the control of access to applications. More particularly, embodiments of the invention relate to systems, hardware, computer-readable media, and methods for implementing and using a generic authorization and authentication framework to dynamically define and control access to multiple applications.

BACKGROUND

Entities often employ a variety of different applications in connection with their operations. In general, any given user may need access to some, but not all, of those applications. Accordingly, entities typically authorize a user to access only the applications needed by that user. These limitations on access can be imposed for a variety of reasons. For example, data and system security may be enhanced by limiting user access only to the applications needed by the user.

Although such restrictions on access have been generally effective, typical schemes for limiting access to selected applications have proven cumbersome and inefficient in their implementation and administration. For example, at least some authorization models are tied to a single application, that is, these authorization models are each application-specific and therefore lack flexibility. Thus, and depending upon how many applications are employed by an entity, the administrators in the entity may have to spend significant time and resources implementing and administering numerous different authorization models, one for each different application.

Another problem with the application-specific approach to access is that these types of authorization models are typically associated with inefficient internal design and architecture. Such inefficiency, in turn, can lead to poor performance and code workflows as access control evaluation processes may involve complex lookups and matches to the access privileges of a particular user, or users.

One further problem with many known authorization models is that they do not enable the definition and use of an environment where one or more users, sometimes referred to as tenants, may have access only to selected portions or elements of an application. Moreover, these models do not enable a tenant to exercise control over its environment.

In light of problems and shortcomings such as those noted above, it would be useful to be able to implement and utilize a generic user-centric authorization framework that is applicable across multiple applications and/or versions of applications. It would also be useful to be able to dynamically modify the framework in response to, or anticipation of, changes in authorization needs.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which:

FIG. 4a discloses aspects of an example application authorization profile;

FIG. 4b discloses aspects of an example tenant authorization profile;

DETAILED DESCRIPTION OF SOME EXAMPLE EMBODIMENTS

Figure 1:
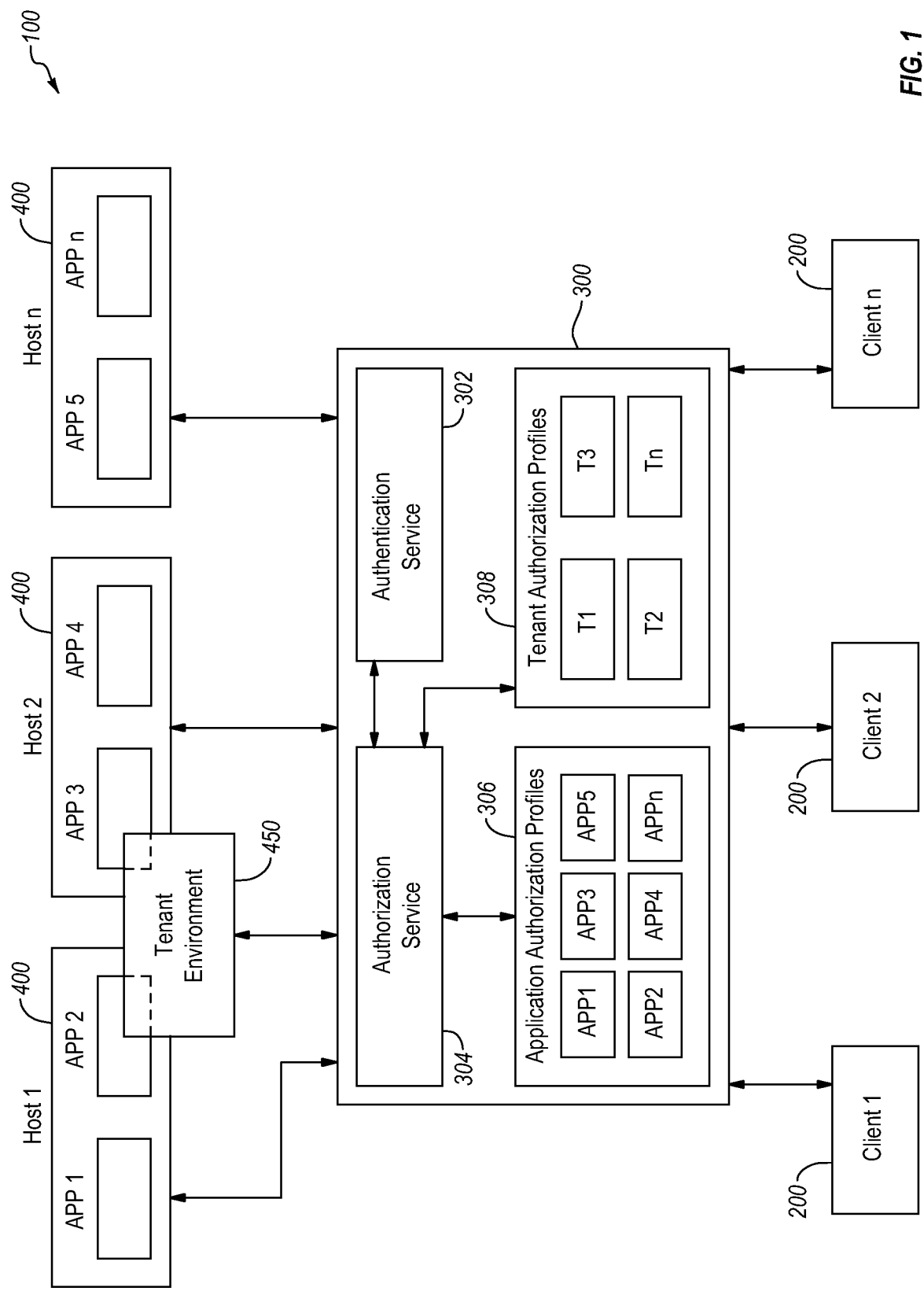
FIG. 1 is directed to aspects of an example operating environment for at least some embodiments.

Embodiments of the present invention generally concern systems, hardware, computer-readable media and methods for implementing and using a generic authorization and authentication framework to dynamically define and control access to multiple applications.

In at least some embodiments, a framework is defined that generally includes an authentication component that operates in cooperation with an authorization component. The authorization component, which is application agnostic, operates in conjunction with one or more application authorization profiles, each of which generally defines an application role for a corresponding application. Each application role, in turn, is associated with a respective privilege mask which defines particular privileges that can be granted with respect to that application upon proper authorization and authentication of the user.

The authorization component receives, from the authentication component, a set of user characteristics for authorization. The user characteristics may include, for example, a username and identification of the group or groups to which the user belongs. Upon receipt of the user characteristics, the authorization component then attempts to match the identified groups with the application roles defined in the application authorization profiles. A set of matching application roles, and their respective privilege masks, are then returned from the authorization component to the authentication component. At this point then, authorized users of the application(s) have been identified, but those authorized users must still be authenticated before they can gain access.

The authentication component then places the application roles and privilege masks into a token, such as Security Assertion Markup Language (SAML) token for example. The token is then returned to the application, or applications, where the token can be used by the applications to enforce access control with respect to authorized users.

In some embodiments at least, the content of the token can be dynamically modified to suit changes, which can be temporary or permanent, concerning the roles of one or more existing and/or new authorized users. For example, if the level or extent of access to an application needed by a particular user should change, the user characteristics can be updated and sent to the authentication component which can then generate a modified token for use by the application, or applications, implicated by the changed access requirement. By way of illustration, if the application administrator were to leave temporarily on vacation, another user could be temporarily granted the access rights of the application administrator.

In addition to the application authorization profiles discussed above, the authorization component can also operate in conjunction with one or more tenant authorization profiles. In general, a tenant environment can be defined that enables authorized users to access certain parts or elements of an application, but not all aspects of the application. These tenant environments are thus sometimes referred to as providing for an intra-application tenancy because users in these tenant environments do not have full access to the application(s). The tenant environment can span multiple servers, or may be associated with only a single server, and the tenant environment may be associated with multiple users. In some instances at least, multiple tenant environments can be defined and employed.

A tenant administrator can use the tenant authorization profiles to control user access to the parts of the applications embraced by the tenant environment. In general, the tenant authorization profiles are similar to the application authorization profiles in terms of the way that the tenant authorization profiles are defined and used. By way of illustration, the tenant authorization profiles, and associated tokens, can be dynamically updated to suit changes concerning the roles of existing and/or new authorized users in the tenant environment.

Regardless of whether tenant authorization profiles and/or application authorization profiles are employed, at least some embodiments of the invention may be advantageous inasmuch as they implement a single sign-on (SSO) functionality that can enable a user to gain access to multiple independent hardware and/or software, which may be disparate and unrelated to each other in some cases, by way of a single authorization service. The nature of the authorization schemes disclosed herein is such that they could be employed, for example, using a variety of mechanisms including, but not limited to, command line (CLI), user interface (UI), web services, or daemon to daemon.

As may be evident from the preceding discussion, and other disclosure herein, embodiments of the invention may provide various advantages, although it is not necessary, or required that any particular embodiment(s) provide any particular advantage(s). Moreover, and consistent with the foregoing statement, embodiments within the scope of one or more claims may additionally, or alternatively, provide one or more advantages not specifically enumerated herein. Finally, to the extent that possible advantages are enumerated herein, those may be present in one or more embodiments in any combination.

A. Example Operating Environments

In general, embodiments of the invention may be employed in connection with an operating environment, one example of which is denoted at 100 in FIG. 1. In FIG. 1, the example operating environment 100 may be a network such as a local area network, a wide area network, or any other networked configuration. Moreover, the operating environment 100, or any group of one or more of its elements, may comprise, form an element of, or constitute, a cloud computing environment. For example, one or more nodes, discussed below, may comprise elements of a cloud computing environment. The environment 100 may include various devices including servers and other computers that are interconnected. The operating environment 100 may employ a variety of communication media, such as hardwire, wireless, or some combination thereof. In some instances, some or all of the operating environment 100 may comprise an optical communication network.

As indicated in FIG. 1, the example operating environment 100 includes a plurality of clients 200, which can be virtual or physical machines that communicate with an authorization/authentication (A/A) host 300, which may be in the form of a server. The A/A host 300, in turn communicates with one or more hosts 400, one of more of which may take the form of a server, that each host one or more applications. Any one or more of the hosts 400 may be a virtual machine or a physical machine. Thus, in the illustrated example, Host 1 hosts APP1 and APP2, Host 2 hosts APP3 and APP4, and Host 'n' hosts APP5 and APPn. Any one or more of the hosts 400 can be a backup server, such as an EMC Avamar server or NetWorker server, although the scope of the invention is not limited to those example servers. Where one or more of the hosts 400 is a backup server, such hosts may host a backup application such as EMC Networker or EMC Avamar, configured to communicate with one or more clients 200, by way of the A/A server 300, so as to back up and restore client 200 data.

In general, and as discussed in further detail below, the A/A host 300 implements an authentication service 302 and an authorization service 304. The authentication service 302 provides the authorization service 304 with a set of user characteristics to authorize. Information concerning any authorized users identified by the authorization service 304 is then transmitted to the authentication service 302 which generates a token that is provided to the application(s) so that the applications are able to authenticate the authorized users when those users request access to the applications. As part of an authorization process, the authorization service 304 may access one or more application authorization profiles 306 APP1 . . . APPn and/or tenant authorization profiles 308 T1 . . . Tn.

While the authentication service 304 and authorization service 302 are indicated in the example of FIG. 1 as being provided by a common host, it should be understood that in other embodiments, the authentication service 304 and authorization service 302 are hosted by different respective hosts. Accordingly, the scope of the invention is not limited to the example disclosed in FIG. 1.

As further indicated in FIG. 1, a tenant environment 450 may be defined that embraces elements of one or more applications that are accessible to authorized and authenticated users. With brief reference to the specific example of the EMC NetWorker application, tenant environments are sometimes referred to as restricted data zones (RDZ) because users do not have full access to the application(s). Within the tenant environment 450, users may not be able to access all the elements of a particular application, or applications, but only some of those elements. In the example of FIG. 1, elements of APP2 (Host 1) and APP3 (Host 2) may be accessible to authorized and authenticated users. As the foregoing indicates, the tenant environment 450 can also span multiple hosts, such as Host 1 and Host 2 in the example of FIG. 1, and can accommodate multiple tenants.

B. Example Host Configuration

Figure 2:
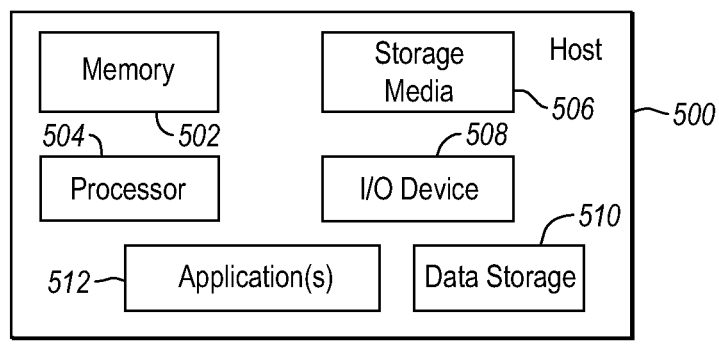
FIG. 2 is directed to an example implementation of a computing device, such as a host, that may be employed with at least some embodiments.

As noted above, any one or more of the clients 200, A/A host 300, and hosts 400 can take the form of a computing device, one example of which is denoted at 500. In the example of FIG. 2, the computing device 500 includes a memory 502, one or more hardware processors 504, non-transitory storage media 506, I/O device 508, and data storage 510. As well, one or more applications 512 are provided that comprise executable instructions. In some instances, such as where the A/A host 300 is in the form of a computing device, the applications 512 can include an instance of an authorization/authentication application.

C. Authorization/Authentication Architecture

Figure 3:
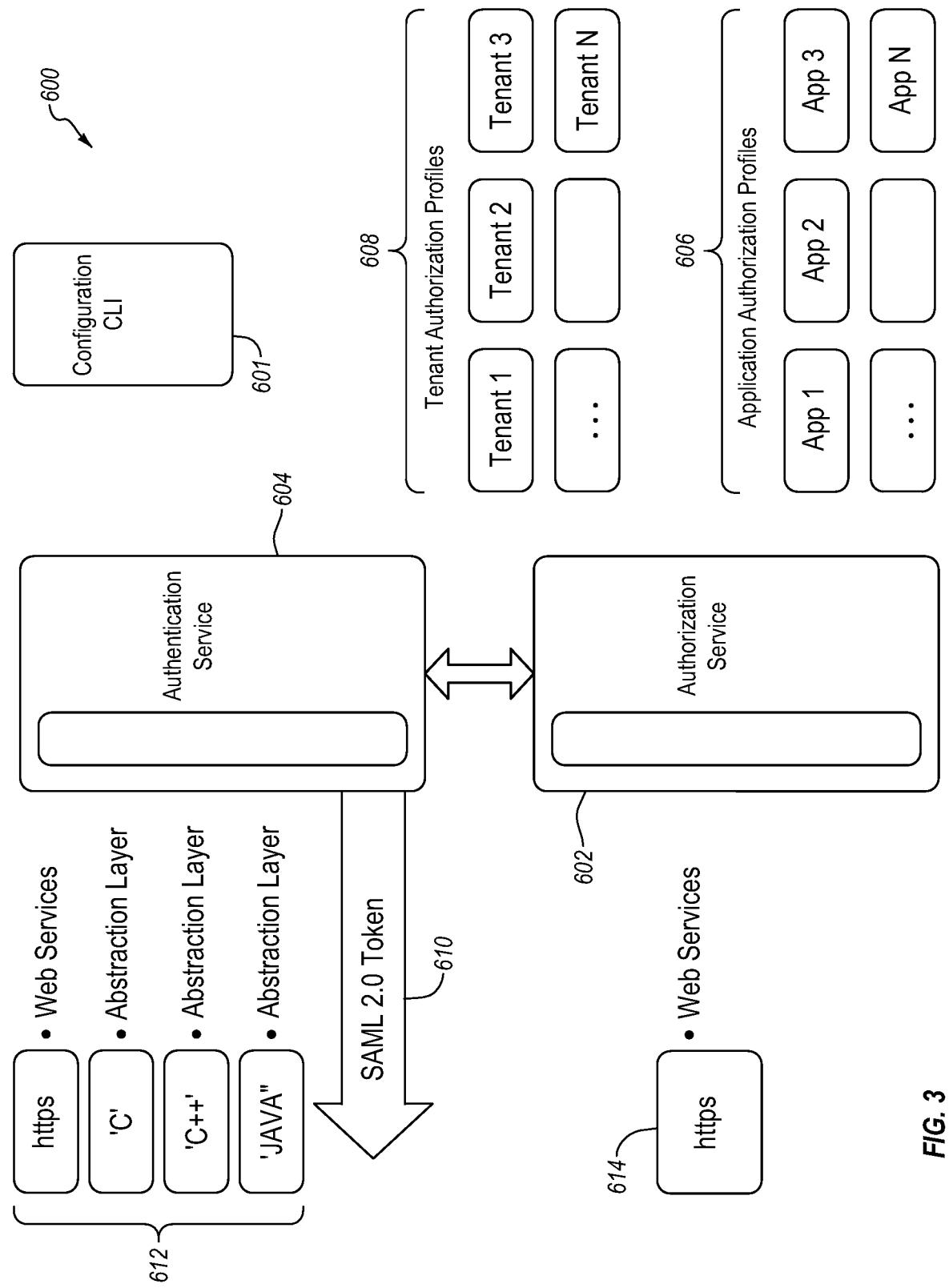
FIG. 3 is directed to an example implementation of an authorization/authentication architecture.

With reference now to FIG. 3, further details are provided concerning aspects of an example A/A architecture, denoted generally at 600. Part or all of the A/A architecture 600 can be in the form of code stored on non-transitory storage media and executable by one or more physical processors or other devices.

As shown in FIG. 3, the A/A architecture 600 includes, or operates in connection with, a configuration command line interface (CLI) 601 that enables an administrator or other personnel to configure the A/A architecture 600. An authentication service 602 of the A/A architecture 600 interacts with an authentication service 604. The authorization service 602 has access to one or more application authorization profiles 606, each of which is specific to a particular application, or version of an application, as the case may be. The authorization service 602 also has access to one or more tenant authorization profiles 608, each of which is specific to a particular tenant of a tenant environment.

In general, the outcome of the authorization workflow performed by way of the A/A architecture 600 will be a token 610, such as a SAML token for example, that is generated by the authentication service 604 and provides a vehicle for an application to enforce access control. The token 610 can be used securely via consuming applications, that is, applications that employ the token to perform authentication of authorized users. Thus, and as discussed below, the token 610 provides the application with an understanding of the user, the Lightweight Directory Access Protocol (LDAP) groups of the user, and the application roles of the user. The scope and content of the token 610 can change dynamically dependent upon the application authorization profiles 606 and the tenant authorization profiles 608, discussed elsewhere herein.

For example, the SAML token can be extended to provide the authorization details, including extensions such as, but not limited to, any one or more of the application, the application version, LDAP Groups (a user can be associated with multiple LDAP Groups), application role, and application role opaque object. The SAML token can contain multiple distinct blocks of this information. In this way, the authorization service 602 can support multiple versions of the same application, or even different applications. In at least some embodiments, a token 610 such as an SAML token, is the sole mechanism for providing authentication/authorization information to applications within an operating environment, one example of which is the environment associated with the EMC Enterprise V2 application. An application receiving the token 610 can verify that the token 610 is valid and/or is not required. As also discussed immediately below, the token 610 can be utilized in different ways depending upon the authentication service 602 that is provided.

For example, and with reference to the EMC Enterprise V1 Application, the authentication service 604 produces a token 610, such as a SAML token, that contains the security assertions for an authenticated user. In EMC Enterprise V1 Application, these assertions are used by the EMC Enterprise V1 Application to map authenticated users to existing EMC NetWorker user groups. The NetWorker user groups define the user privileges for access control. In EMC Enterprise V2 Application for example, the authorization service 602 will provide this mapping, and an application, such as EMC Enterprise V2 Application, will not be required to maintain these mappings.

The authorization service 602 is application unaware, that is, not configured for use with specification applications, or application specific. However, the authorization service 602 becomes application aware through the use of the application authorization profiles 606. These application authorization profiles 606 provide a vehicle for using an authentication/authorization request from a user to provoke a corresponding response from an application that the user has requested to access.

In general, the authentication service 602 will provide the authorization service 604 with a set of user characteristics to authorize. An example set of user characteristics may include, but is not limited to, a Username, and a set of LDAP groups to which the user belongs. Additional, or alternative, characteristics can be employed however.

The membership of a user in one or more LDAP groups may reflect certain queries and other operations that the user has performed and which are therefore indicative of the need of that user to have access to one or more particular applications. LDAP group information is also useful as LDAP can be used to assign a privilege, such as application access, to a group of users. Finally, LDAP can be used to store user credentials in a network security system, and the credentials can be retrieved with a password and decrypted key, thus enabling the user to various services. The use of LDAP groups as a user characteristic is not required however and additional, or alternative, information can be used as well.

In any event, once the authorization service 602 has received the user characteristics information, the authorization service 602 will then attempt to match the provided user characteristics to the roles defined in the application authorization profiles 606. For each match, the authorization service 602 will extract the application role and application role privilege mask. When all of the application authorization profiles 606 have been searched, the set of matching application roles and privilege masks will be returned by the authorization service 602 to the authentication service 604, thereby identifying the authorized user(s) to the authentication service 602.

The authentication service 604 then places the received information in the SAML, or other, token to be returned to the application. In this way, a user may be granted access to one or more applications based on a match between his user characteristics and the application roles defined in the application authorization profiles 606. This approach to access control may be referred to herein as Role Based Access Control (RBAC). More specifically, the ability of a user to perform one or more actions with respect to an application, or one or more particular elements of an application, is dictated by the privileges, that is, role, associated with that user. Enforcement of the role is an application-specific task that is carried out by the particular application(s) implicated by the actions that the user wishes to perform.

As noted elsewhere herein, the A/A architecture 600 may provide for dynamic authorization (DA) which, in general, refers to the notion that the privileges granted to a user are not static and can be changed at any time. Thus, an administrator or other personnel could dynamically define and/or modify, as applicable, the privileges granted to a particular user. The definition of the privileges granted could be controlled, for example, by any of a variety of different variables or groups of variables, including time, location, or application. As well, provision may be made for identifying any conflicts in user privileges, and then resolving any such conflicts according to default or other rules and values.

For example, the privileges of a user with respect to certain applications could be revoked if the user no longer required access to those applications. As another example, the privileges of users in certain physical locations or business units may be modified to reflect moves and reassignments. As a final example, user privileges could be assigned for a set duration of time, and then automatically expire at the end of the time period.

As noted earlier herein, the A/A architecture 600 supports the implementation of tenant environments that may span multiple servers, or include multiple tenants in a single server. Accordingly, another variable that can be used in connection with a DA process is the association of a particular user with a tenant and/or tenant environment. For example, upon association of a user with a tenant or tenant environment, the privileges of that user can be modified to reflect the access rights associated with that tenant or tenant environment.

Finally, FIG. 3 indicates that the authentication service 604 can be configured and modified using a variety of different programming languages 612, and/or using https. Such languages include, but are not limited to, 'C,' 'C++,' and Java, and the configuration of the authentication service 604 can take place by way of an abstraction layer, or web service in the case of https. In similar fashion, the authorization service 602 can be configured and modified using, for example, https 614 and web services, although other programming mechanisms could alternatively be employed.

C. Example Application Authorization Profiles

With continued attention to FIG. 3, and directing attention now to FIG. 4a as well, further details are provided concerning example embodiments of application authorization profiles.

As noted elsewhere herein, the authorization service 602 is generic, or application-unaware, in the sense that the authorization service 602 is not configured or constrained for use with any particular application, version of an application, or group of applications. However, the authorization service 602 is able to carry out processes that do relate to particular applications. This functionality of the authorization service 602 is enabled by the application authorization profiles 606.

Through the use of multiple application-specific application authorization profiles 606, a single authorization service, such as the authorization service 602, is able to provide authorization services for multiple applications. Any number of application authorization profiles can be employed so there is no limit to the flexibility of the authorization service 602. Thus, multiple users of multiple applications and/or versions of applications can be authorized by way of a single authorization service.

Initially, an application provides an application authorization profile 606 to the authorization service 602. In at least some embodiments, the application authorization profile 606 can be specific to a particular version of the application, although that is not necessarily required. The authorization service 602 then registers the received application authorization profile 606. Where multiple instances of an application are operating in an environment, only a single application authorization profile 606 need be provided to the authorization service 602 for that application, or version.

For example, if an instance of an application attempts to register a corresponding application authorization profile 606 with the authorization service 602, and an application authorization profile 606 for another instance of that application or version has already been registered, the authorization service 602 will notify the instance of the application that is attempting registration that an application authorization profile 606 already exists for that application or version. Thus, even if multiple instances of an application are operating, only a single application authorization profile 606 is needed for that application. Moreover, because an application authorization profile 606 can be registered for each version of an application, the authorization service 602 is able to maintain backwards compatibility with respect to relatively older versions of the application.

As noted elsewhere herein, application authorization profiles 606 can include any suitable type, or types, of information. In general, some embodiments of the application authorization profiles 606 operate as a vehicle to enable an administrator or other authorized user to map one or more user groups, such as LDAP groups for example, to one or more application roles included in, or at least identified by, the application authorization profiles 606. In at least some embodiments, the mapping is not provided via the application authorization profile itself, since mapping implicitly requires knowledge of the LDAP Groups within the organization and how those LDAP Groups will map to the application roles. Rather, in these example embodiments, the application authorization profile provides a template for the application roles but it is the authentication/authorization administrator who defines the mappings and usage of the application roles.

With specific reference to one example, the authorization service 602 may require a mapping of LDAP groups to the application roles to be performed. After an application has registered its profile with the authorization service 602, an appropriate user with an authorized role, such as a security or IT administrator for example, would then update the LDAP groups-to-application role mapping. In some embodiments at least, the application administrator could be prevented from involvement in the mapping process.

Each application role, in turn, is associated with a respective privilege mask which defines particular privileges that can be granted with respect to that application upon authentication of an authorized user in the user group(s). In this way, each application role is defined to include certain privileges, and an application authorization profile 606 can thus be used to associate one or more users with those privileges.

In one example embodiment, an application authorization profile 606 includes information that identifies the application and application version to which the application authorization profile 606 applies, and the application authorization profile 606 also includes information that includes a list of application roles. As indicated in FIG. 4a, in some embodiments, one or more of the application roles 616 may define a corresponding Application Role Opaque Object (AROO) 618, which may take the form of a privilege mask and/or other information specific to the application identified in the application authorization profile 606. In general, the nature of an opaque object 618, such as the AROO, is such that complete information about it may only be accessible or available to certain users, such as an administrator for example, even though the existence and other properties of the opaque object 618 may be apparent to users other than administrators as well. As further indicated in FIG. 4a, a particular application and version may be associated with a plurality of different application roles 616.

D. Example Tenant Authorization Profiles

While the preceding discussion has focused on application authorization profiles, further details are provided now concerning example embodiments of tenant authorization profiles. As noted earlier, and indicated in FIG. 1 for example, tenant environments may be defined that are limited to a particular tenant, or group of tenants, and which enable access only to certain elements or aspects of one or more applications. Such access by the tenant(s) can be controlled by a tenant administrator using one or more tenant authorization profiles, such as the tenant authorization profiles 608 disclosed in FIG. 3 for example.

In general, the definition and use of tenant authorization profiles 608 enable tenant administrators the ability to manage and define their own authorization, that is, within the tenant environment, without requiring authorization/authentication service provider administrator involvement. This approach also enables tenant administrators to exclude service provider administrators from being able to modify a tenant authorization profile 608 and thus confers a certain degree of autonomy on the tenant administrator.

A tenant authorization profile 608 can be configured in any suitable manner and the scope of the invention is not limited to any particular type or configuration of tenant authorization profile 608. Nonetheless, at least some example tenant authorization profiles 608 can be configured to enable control of tenant access on one or more bases, or combinations of bases, including exclusion of a particular user or users, time-based restrictions that limit when a user or users can access certain elements or aspects of particular applications, restrictions based on user locations such as geographical and/or business unit locations, and restrictions based on changes to the roles of one or more users. Any other suitable bases could also be used by a tenant administrator to restrict access to certain elements or aspects of one or more applications embraced by a tenant environment. Following are some example use cases for restrictions that could be imposed by a tenant administrator.

For example, the exclusion of one or more particular users is fairly straightforward. In particular, a tenant administrator could exclude a user, including the service provider administrator, from being authorized. In the case of time based restrictions, the tenant administrator could restrict, or disable, authorization for users during blackout periods such as information technology (IT) upgrades, or events such as financial results creation. Time-based restrictions also provide a vehicle for ensuring that existing SAML tokens could be expired for such events. In the case of location based restrictions, a tenant administrator could restrict, or disable, authorization for users from specific geographic locations. As a final example, the elevation of a user role could be implemented temporarily to allow a user a higher authorized role. This restriction or constraint could be combined with time based restrictions. An example use case that would cover this would be elevation of a user while the tenant administrator is on vacation.

With the foregoing in view, and directing attention briefly to FIG. 4b, details are provided concerning an example tenant authorization profile 608. Similar to application authorization profiles 606, a tenant authorization profile 608 may include information concerning the information to which access can be granted, as well as information concerning roles. In the particular example of FIG. 4b, the name of the restricted data, that is, the limited data to which access can be granted, is identified, along with any version information that may pertain to that data. Correspondingly, one or more restricted data roles 617 may be identified as part of the tenant authorization profile 608. As well, one or more of the restricted data roles 617 may define a corresponding Application Role Opaque Object (AROO) 619, which may take the form of a privilege mask and/or other information specific to the data identified in the tenant authorization profile 608.

E. Example Processes

Figure 5:
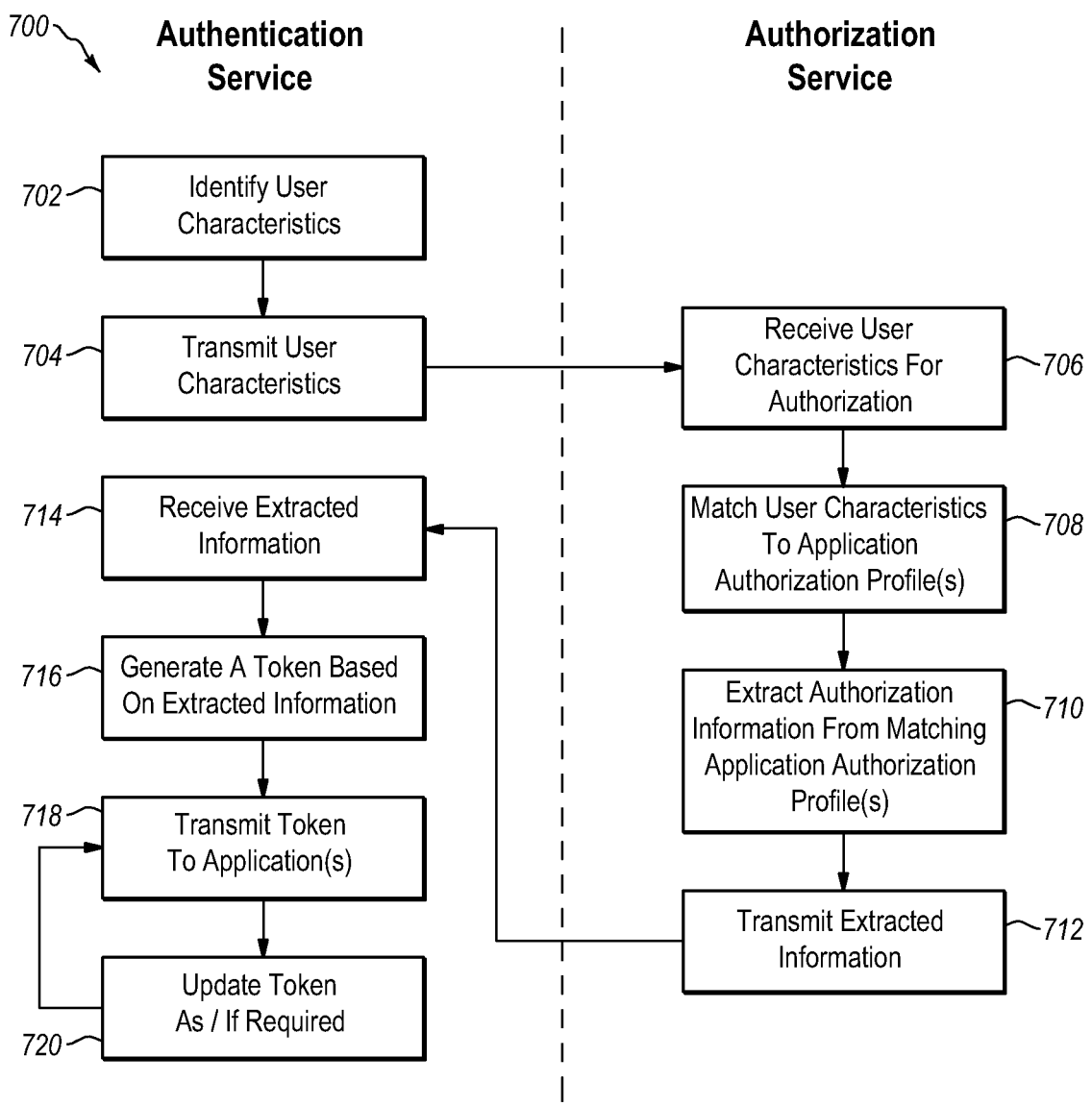
FIG. 5 is a flow chart that discloses aspects of an example method for authorization and token generation.

With reference now to FIG. 5, details are provided concerning a method for authorization and token generation, one example of which is indicated generally at 700. As indicated in FIG. 5, some or all of the method 700 may involve one or more communications between an authentication service and an authorization service. Moreover, while certain elements of the method 700 are indicated as being performed by one or the other of the authentication service and the authorization service, the allocation of the performance of the disclosed elements is presented by way of example only and it should be understood that in other embodiments, some elements can be performed by the authentication service rather than the authorization service, and some elements can be performed by the authorization service rather than the authentication service. Accordingly, the scope of the invention is not limited to the example implementation of FIG. 5.

At 702, one or more user characteristics are identified by the authentication service. The user characteristics may include, for example, a username and the identity of a group or groups to which the user belongs, such as LDAP groups for example. Additional, or alternative, user characteristics can be employed however. After identification, the user characteristics are transmitted 704 to, and received by 706, the authorization service.

The authorization service then performs a query 708 to determine whether the received user characteristics match any application authorization profiles that have been registered with the authorization service. If one or more matches are identified, the authorization service extracts 710 authorization information from the matching application authorization profile, or profiles. The extracted authorization information is then transmitted 712 to the authentication service.

After receipt 714 of the authorization information from the authorization service, the authentication service then generates 716 a token based on the received authorization information. The token is then transmitted 718 to the application to which the token corresponds. If a change occurs in conditions, authorization information, user characteristics, or the operating environment, for example, the token can be updated 720 and the updated token transmitted 718 to the application to which the token corresponds.

Figure 6:
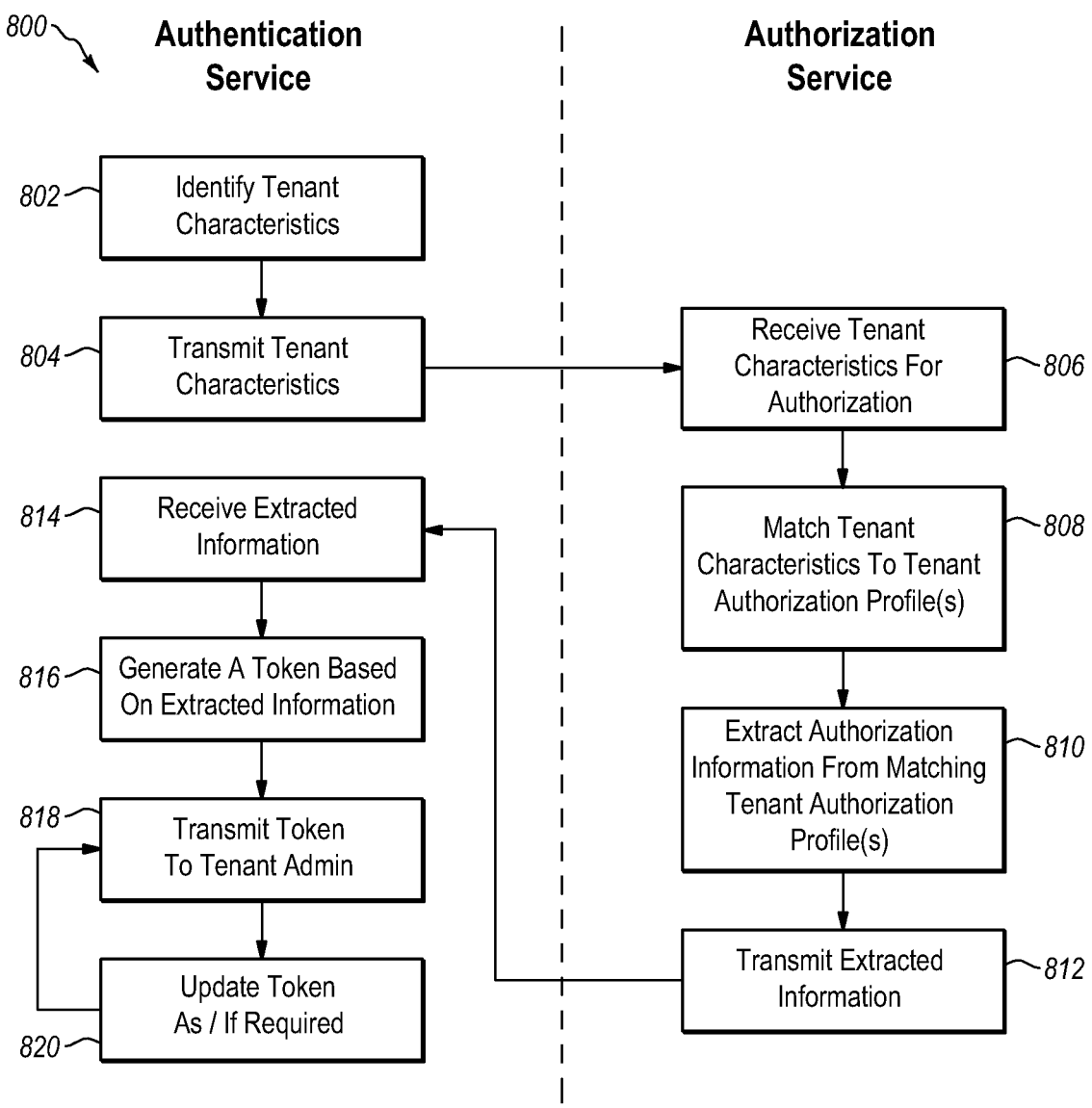
FIG. 6 is a flow chart that discloses aspects of an example method for authorization and authentication in a tenant environment.

With attention now to FIG. 6, details are provided concerning a method for authorization and authentication in a tenant environment, one example of which is indicated generally at 800. As in the case of the method of FIG. 5, the allocation of functions indicated in FIG. 6 is provided by way of example only and, in other embodiments, more, fewer, or different functions may be performed by the authentication service and/or the authorization service.

Initially, one or more tenant characteristics are identified 802 by the authentication service. The tenant characteristics may include, for example, a username and the identity of a group or groups to which the tenant belongs, such as LDAP groups for example. Additional, or alternative, tenant characteristics can be employed however. After identification, the tenant characteristics are transmitted 804 to, and received by 806, the authorization service.

The authorization service then performs a query 808 to determine whether the received tenant characteristics match any tenant authorization profiles that have been registered with the authorization service. If one or more matches are identified, the authorization service extracts 810 authorization information from the matching tenant authorization profile, or profiles. The extracted authorization information is then transmitted 812 to the authentication service.

After receipt 814 of the authorization information from the authorization service, the authentication service then generates 816 a token based on the received authorization information. The token is then transmitted 818 to a tenant administrator who can use the token to authenticate a tenant for access to data and/or functions embraced by the tenant environment. If a change occurs in conditions, authorization information, user characteristics, or the tenant environment, for example, the token can be updated 820 and the updated token transmitted 818 to the tenant administrator.

Figure 7:
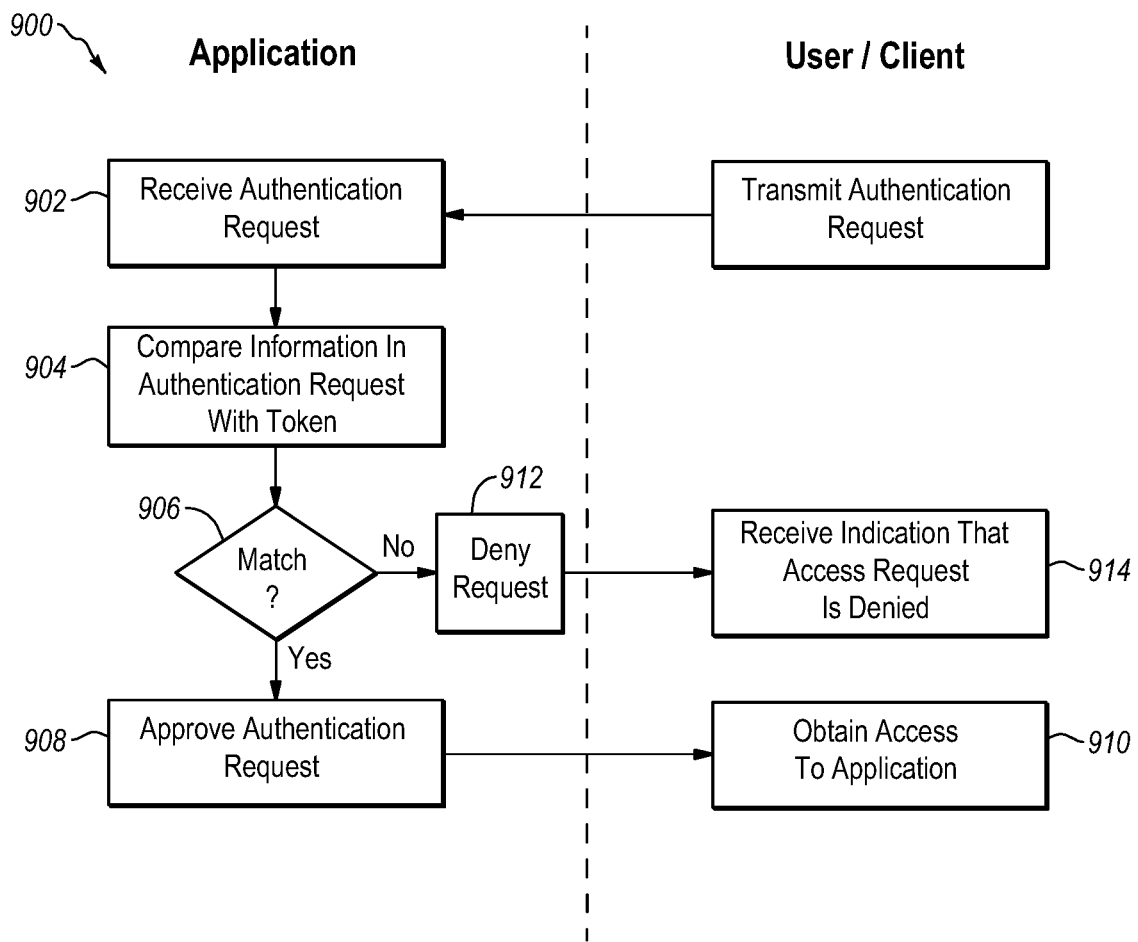
FIG. 7 is a flow chart that discloses aspects of an example authentication process.

Directing attention now to FIG. 7, details are provided concerning a method for authentication, one example of which is denoted generally at 900. While the indicated example of FIG. 7 is performed in connection with one or more applications and application authorization profiles, it should be understood that the method 900 is generally applicable to a tenant environment where a tenant administrator authenticates tenants for access to data and/or functions embraced by the tenant environment.

Initially, an application receives 902 an authentication request from a user who desires access to the application. The application can then authenticate the user, or not, by comparing 904 the authentication request from the user with a token. If there is a match 906, then the authentication request is approved 908 and the user is allowed to obtain access 910 to the application. If there is no match 906 between the authentication request and the token, the authentication request is denied 912, and the requesting user is notified 914 that the authentication request has been denied.

Figure 8:
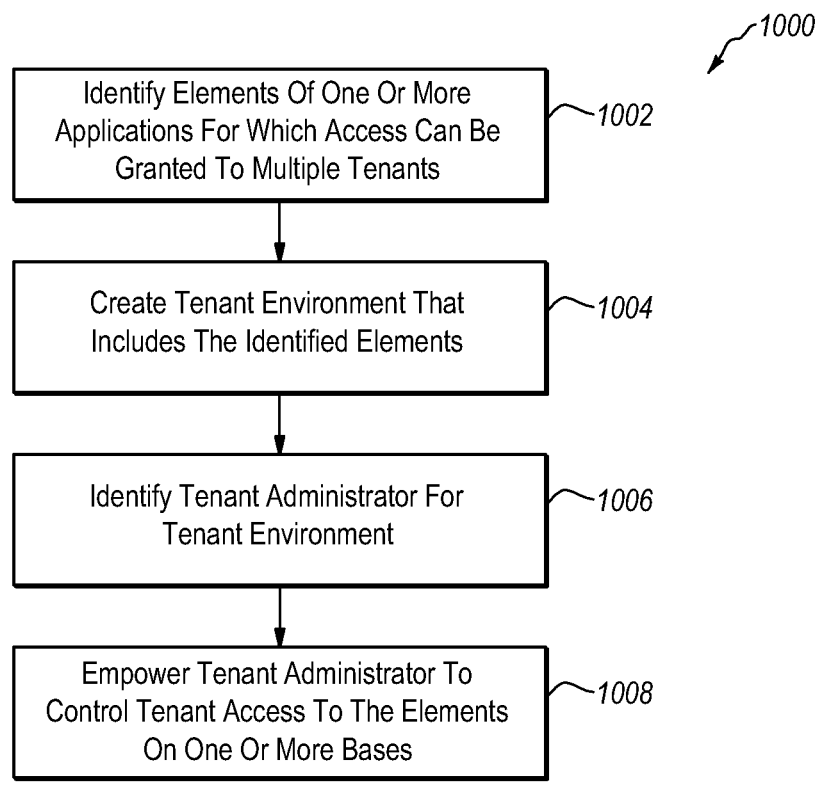
FIG. 8 is a flow chart that discloses aspects of an example method for creation and administration of a tenant environment.

With reference now to FIG. 8, details are provided concerning a method creation and administration of a tenant environment, one example of which is denoted generally at 1000. Initially, the elements, such as data and/or functions, of one or more applications are identified 1002 for inclusion in the tenant environment and to which access is to be granted to one or more tenants. As noted elsewhere herein, a tenant environment can embrace portions of multiple applications, and a tenant environment can span multiple servers, although neither of these circumstances is required with regard to any particular tenant environment.

After the elements to be included within the tenant environment have been identified, a tenant environment is then created 1004 that extends to those elements. A tenant administrator can then be identified 1006 who can control access by one or more tenants to the elements embraced within the tenant environment. Finally, the tenant administrator is given 1008 the ability to control such access. As well, the tenant administrator may have the ability to prevent others, such as other administrators, from modifying, adding, or deleting tenant authorization profiles.

Figure 9:
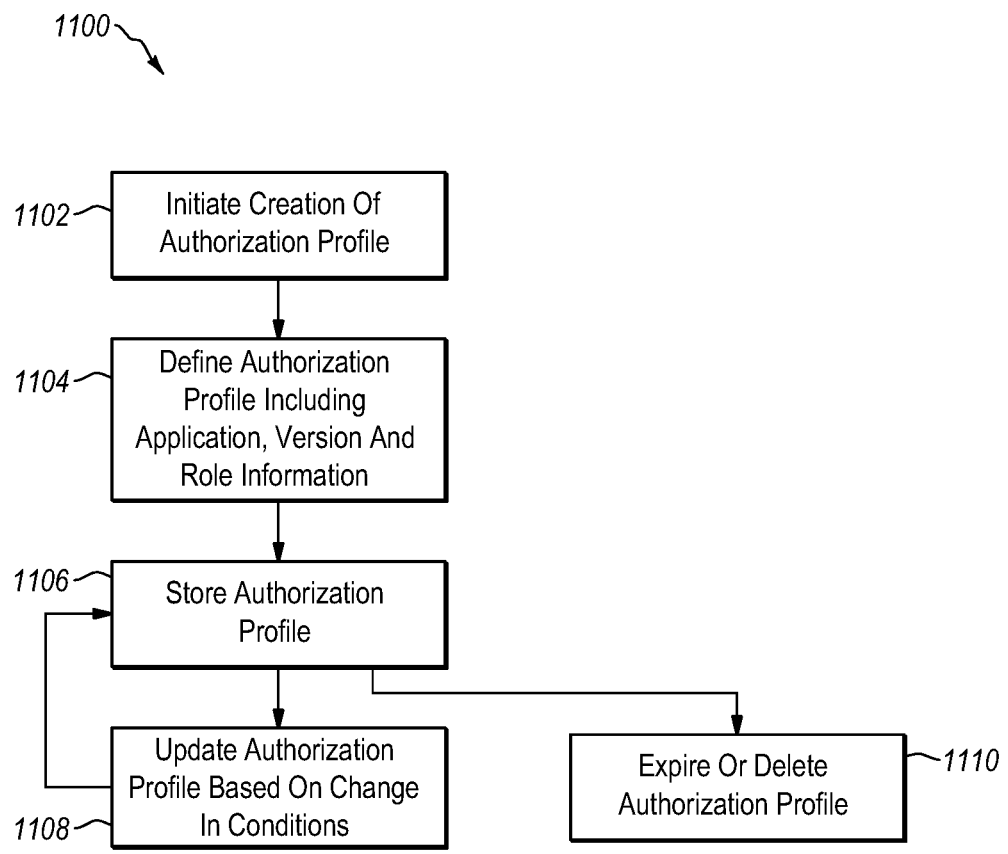
FIG. 9 is a flow chart that discloses aspects of an example method for creating and updating an authorization profile, such as a tenant authorization profile or an application authorization profile.

Turning finally to FIG. 9, details are provided concerning aspects of a method for creating and updating an authorization profile, such as a tenant authorization profile or an application authorization profile, one example of which is denoted at 1100. Initially, a tenant authorization profile or application authorization profile is commenced 1102. The authorization profile may be defined 1104 to include or identify one or more applications, application version information, particular elements (such as data and/or functions of one or more applications) that are to be made accessible to users, and role information. After the authorization profile is created, it can then be stored 1006. In general, the authorization profile is stored such that it can be accessed by an authorization service, or tenant administrator, for example.

As noted herein, circumstances can arise that require one or more changes to an authorization profile, such as an application authorization profile or tenant authorization profile for example. Thus, an authorization profile can be dynamically updated 1008 in response to the occurrence of such circumstances. Thus, a system employing architectures and methods such as those disclosed herein possesses significant flexibility and responsiveness in modifying user access to applications, or elements of applications, based on changing circumstances.

With continued reference to FIG. 9, an authorization profile, whether an application authorization profile or tenant authorization profile, can be configured 1010 to automatically expire or be deleted. Such automatic expiration or deletion can occur, for example, after the passage of a predetermined amount of time, after an application has been accessed a particular number of times by a particular user or tenant, or upon occurrence or non-occurrence of one or more particular events. In other instances, a tenant administrator or other administrator, as applicable, can delete one or more authorization profiles.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. As well, such media are examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
managing user access to an application hosted by a computing system, by performing operations comprising:
receiving at the application, a token from an authentication component of an authorization/authentication service, which includes the authentication component and an authorization component,
wherein the token includes an application role and a privilege mask associated with the application role,
wherein the application role corresponds to a role of an entity with respect to the application, and the privilege mask defines one or more privileges, which can be granted to the entity with respect to the application upon authentication of the entity based on the role of the entity, and
wherein the token is generated by the authentication component based on the application role and the privilege mask, which has been generated by the authorization component in response to a set of characteristics sent by the authentication component to the authorization component;
receiving at the application, by way of the authorization/authentication service with which the application is in communication, an authentication request from the entity seeking access to the application;
identifying a change in the computing system;
based on the change, receiving an updated token at the application from the authorization/authentication service;
evaluating the authentication request based on the updated token;
approving the authentication request when information in the authentication request matches the updated token;
granting, to the entity, access to the application when the authentication request has been approved, wherein granting the entity access to the application comprises enabling the entity to access and run one or more functions of the application based on the privilege mask; and
denying access to the application when the information in the authentication request does not match the updated token and notifying the user the authentication request has been denied,
wherein the approving, granting, and denying processes are performed by the application to which the entity is seeking access, and
wherein, when the entity or a different entity seeks access to another application, user access to the another application is controlled by the another application.

2. The method as recited in claim 1, wherein approval of the authentication request is based on authorization information in the token indicating that tenant characteristics match a tenant authorization profile associated with the application.

3. The method as recited in claim 1, wherein one of the tokens is a Security Assertion Markup Language (SAML) token.

4. The method as recited in claim 1, wherein the method is performed in a tenant environment that provides intra-application tenancy in which a user in the tenant environment does not have access to all aspects of the application.

5. The method as recited in claim 1, wherein the method enables single sign-on (SSO) functionality that permits an authorized user to gain access to multiple independent hardware and/or software.

6. The method as recited in claim 1, wherein one of the application and the another application is a backup application.

7. A non-transitory storage medium having stored therein instructions which are executable by one or more hardware processors, to perform:
managing user access to an application hosted by a computing system, by performing operations comprising:
receiving at the application, a token from an authentication component of an authorization/authentication service which includes the authentication component and an authorization component,
wherein the token includes an application role and an associated a privilege mask associated with the application role,
wherein the application role corresponds to a role of an entity with respect to the application, and the privilege mask defines one or more privileges, which can be granted to the entity with respect to the application upon authentication of the entity based on the role of the entity, and
wherein the token is generated by the authentication component based on the application role and the privilege mask, which has been generated by the authorization component in response to a set of characteristics sent by the authentication component to the authorization component;
receiving at the application, by way of the authorization/authentication service with which the application is in communication, an authentication request from the entity seeking access to the application;
identifying a change in the computing system;
based on the change, receiving an updated token at the application from the authorization/authentication service;
evaluating the authentication request based on the updated token;
approving the authentication request when information in the authentication request matches the updated token;
granting, to the entity, access to the application when the authentication request has been approved, wherein granting the entity access to the application comprises enabling the entity to access and run one or more functions of the application based on the privilege mask; and
denying access to the application when the information in the authentication request does not match the updated token and notifying the user the authentication request has been denied,
wherein the approving, granting, and denying processes are performed by the application to which the entity is seeking access, and
wherein, when the entity or a different entity seeks access to another application, user access to the another application is controlled by the another application.

8. The non-transitory storage medium as recited in claim 7, wherein approval of the authentication request is based on authorization information in the token indicating that tenant characteristics match a tenant authorization profile associated with the application.

9. The non-transitory storage medium as recited in claim 7, wherein one of the tokens is a Security Assertion Markup Language (SAML) token.

10. The non-transitory storage medium as recited in claim 7, wherein the operations are performed in a tenant environment that provides intra-application tenancy in which a user in the tenant environment does not have access to all aspects of the application.

11. The non-transitory storage medium as recited in claim 7, wherein performance of the operations enables single sign-on (SSO) functionality that permits an authorized user to gain access to multiple independent hardware and/or software.

12. The non-transitory storage medium as recited in claim 7, wherein one of the application and the another application is a backup application.

\* \* \* \* \*